United States Patent

Boer

[15] 3,676,807

[45] July 11, 1972

[54] FILM ATTENUATOR WITH DISTRIBUTED CAPACITANCE HIGH FREQUENCY COMPENSATION

[72] Inventor: Machiel Boer, Beaverton, Oreg.

[73] Assignee: Tektronix, Inc., Beaverton, Oreg.

[22] Filed: May 19, 1971

[21] Appl. No.: 144,787

[52] U.S. Cl. ................................333/81 A, 29/592, 323/74, 323/79, 338/308

[51] Int. Cl. ..........................................................H03h 7/24

[58] Field of Search ............333/81 R, 81 A, 70 CR; 338/60, 338/308, 309; 323/74, 79, 94; 29/592

[56] References Cited

UNITED STATES PATENTS

| | | | |
|---|---|---|---|
| 3,260,971 | 7/1966 | Bacher et al. | 333/81 A |
| 3,390,356 | 6/1968 | Ryals et al | 333/81 X |
| 3,564,464 | 2/1971 | Hancock et al. | 333/81 A |

*Primary Examiner*—Paul L. Gensler
*Attorney*—Buckhorn, Blore, Klarquist & Sparkman

[57] ABSTRACT

A thick film attenuator including series and shunt resistances coated on an insulator substrate is described in which the first distributed capacitance of a lead conductor connecting a variable capacitor in parallel with the series resistance is compensated by the second distributed capacitance of a ground conductor on the opposite side of such series resistance. This prevents the attenuation ratio from changing with frequency for high frequency input signals which tends to be caused by such first distributed capacitance with high impedance attenuators due to the greater length of the series resistance. The spacing between the lead conductor and the series resistance decreases with distance along such resistor from the terminal connected to the variable capacitor, while the spacing between the ground conductor and the series resistance increases with such distance to provide the first and second distributed capacitances which change hyperbolically with such distance so that the attenuation ratio of the capacitance divider is the same as that of the resistance divider at any point along the series resistance.

10 Claims, 9 Drawing Figures

MACHIEL BOER
*INVENTOR*

*BY*

*BUCKHORN, BLORE, KLARQUIST & SPARKMAN*
*ATTORNEYS*

FILM ATTENUATOR WITH DISTRIBUTED CAPACITANCE HIGH FREQUENCY COMPENSATION

BACKGROUND OF THE INVENTION

The subject matter of the present invention relates to electrical signal attenuator circuits and, in particular, to film attenuators formed by coatings of resistive and conductive materials on an insulator substrate in which in which distributed capacitance is provided for high frequency compensation to prevent changes in the attenuation ratio due to frequency variations in the input signal. This compensating distributed capacitance is formed by a ground conductor provided on the opposite side of an input series resistance from the lead conductor connecting a variable capacitor in parallel therewith. The film attenuator of the present invention may be used in a plurality of sections of a step attenuator apparatus as shown in copending U.S. Pat. application Ser. No. 830,071 of D. I. Wilhoit, filed June 3, 1969, now Pat. No. 3,622,919.

High impedance attenuator circuits having a variable capacitor connected in parallel with an input series resistor do not have a good high frequency response due to the distributed capacitance between such resistor and the lead conductor of such capacitor. This distributed capacitance, which increases with high resistance series resistors because of their greater length, causes a change in the attenuation ratio with variations in frequency of the input signal. For a step voltage input signal, this change in attenuation is seen as overshoot on the top of the leading edge of the output voltage step. This limits the high frequency response of amplifiers employing such attenuators including the vertical amplifier of a cathode ray oscilloscope. Previous thick film attenuators, such as shown in U.S. Pat. No. 3,109,983 of Cooper et al., have provided the lead conductor which connects the variable capacitor in parallel with the input resistor on the opposite side of the substrate from such resistor forms such a distributed capacitance which is not compensated by a ground conductor.

In order to solve this problem, the lead conductor connecting the variable capacitor in parallel with the input series resistor in the present attenuator is spaced from such series resistor by an amount which decreases with distance along the resistor from the end of the resistor connected to such capacitor. The ground conductor on the opposite side of the input resistor from the lead conductor, is spaced from such resistor by an amount which increases with such distance so that the first distributed capacitance between the lead conductor and the input resistor and the second distributed capacitance between the ground conductor and such resistor form a capacitive voltage divider having the same attenuation ratio as the resistance divider formed by the input series resistor and the output shunt resistor at any point along such input resistor. This is accomplished by making the first distributed capacitance and the second distributed capacitance change in value hyperbolically with linear changes of resistance along the input series resistor.

A related attenuator is shown in the pending U.S. Pat. application Ser. No. 114,273 of Kenneth C. Holland entitled STEP ATTENUATOR HAVING ATTENUATOR STAGES SELECTIVELY CONNECTED IN CASCADE BY CAM ACTUATED SWITCHES, filed Feb. 10, 1971, which is also assigned to the assignee of the present application.

It is, therefore, one object of the present invention to provide an improved attenuator device having a substantially constant attenuation ratio over a wide band of input signal frequencies.

Another object of the present invention is to provide such an attenuator in which a ground conductor is employed to provide a distributed capacitance for high frequency compensation to prevent the attenuation ratio from changing with frequency due to the mutual capacitance between the input series resistor and the lead conductor of a variable capacitor connected in parallel therewith.

A further object of the invention is to provide such an attenuator of simple and inexpensive construction in which the lead conductor, the ground conductor and the input series resistor are provided as coatings on the same surface of an insulator substrate with the ground conductor on the opposite side of such resistor from the lead conductor, such lead conductor and such ground conductor being spaced from the input series resistor by an amount which increases for one conductor and decreases for the other with distance along such resistor.

Still another object of the present invention is to provide such an attenuator apparatus in which the first distributed capacitance between the lead conductor and the input series resistor and the second distributed capacitance between the ground conductor and such resistor, increases hyperbolically in one case and decreases hyperbolically in the other with distance along such series resistor while its resistance changes linearly with said distance.

An additional object of the invention is to provide such an attenuator of low input capacitance in which the variable capacitor in parallel with the series resistor is connected between the input end of the lead conductor and the input terminal of such resistor.

BRIEF DESCRIPTION OF DRAWINGS

Other objects and advantages of the present invention will be apparent from the following detailed description of preferred embodiments thereof and from the attached drawings of which.

DESCRIPTION OF THE PREFERRED EMBODIMENTS

Figure 1:
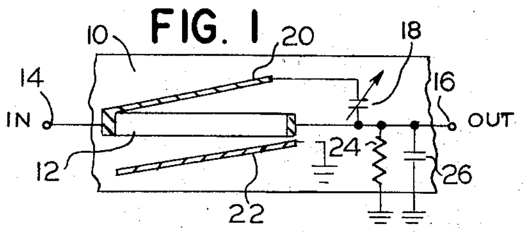
FIG. 1 is an elevation view of one embodiment of attenuator apparatus of the present invention with a portion being shown schematically.

As shown in FIG. 1, one embodiment of the thick film attenuator apparatus of the present invention includes an insulator substrate 10 of crystaline ceramic or other suitable insulating material on which the electrical circuit elements of the attenuator are provided as coatings of resistive material and conductive material. Thus, an input series resistor 12 is provided as a rectangular region of resistance material coated on one side of the ceramic substrate 10 and connected between an input terminal 14 and an output terminal 16 of the attenuator. A first capacitor 18, which may be a variable capacitor like that shown in copending U.S. application Ser. No. 109,334 entitled A VARIABLE CAPACITOR AND ATTENUATOR SECTION INCLUDING THE SAME filed Jan. 25, 1971, by D. I. Wilhoit, is connected in parallel with resistor 12. The first capacitor 18 may be connected between the output terminal of series resistance 12 and the output end of a lead conductor 20 in the form of a strip of conducting material coated on the substrate with its input end connected to the input terminal of such series resistor. A ground conductor 22 is also provided as a strip of conducting material coated on the same surface of the ceramic substrate 10 but on the opposite side of the series resistor 12 from the lead conductor 20. The ground conductor 22 is insulated from the series resistance 12 and is electrically connected to a signal ground terminal.

The attenuator also includes an output shunt resistor 24 connected between the output terminal 16 and ground, and a second capacitor 26 connected in parallel with such shunt resistor. It should be noted that while the shunt resistor 24 and the second capacitor 26 have been shown as separate discrete components for purposes of simplicity, they may actually be formed by coatings of resistance material and conductive material on the ceramic substrate 10. Of course, the values of the series resistance 12 and the shunt resistance 24 vary depending upon the particular attenuation ratio desired and the value of the first and second capacitors 18 and 26 also varies accordingly. Also, the variable capacitor 18 is adjusted so that the multiplication product $R_1C_1$ of the resistance, $R_1$, of the series resistor 12 and the capacitance, $C_1$, of the first capacitor 18 is equal to the multiplication product $R_2C_2$ of the resistance, $R_2$, of the shunt resistor 24 and the capacitance, $C_2$, of the second capacitor 26.

As stated above, for high impedance attenuators in which the series resistance 12 is on the order of one megohm the distributed capacitance between the lead conductor 20 and the series resistance 12 tends to change the attenuation ratio with frequency at high frequency input signals. In order to compensate for this, with the attenuator of FIG. 1, the spacing between the lead conductor 20 and the series resistance 12 increases while the spacing between the ground conductor 22 and such series resistance decreases with distance along the series resistance 12 from its input terminal to its output terminal. This change in spacing causes the first distributed capacitance, $C_u$, between the lead conductor 20 and the series resistance 12 to decrease hyperbolically while the second distributed capacitance, $C_L$, between the ground conductor 22 and such resistance increases hyperbolically with linear changes in resistance along the series resistor 12.

Figure 2:
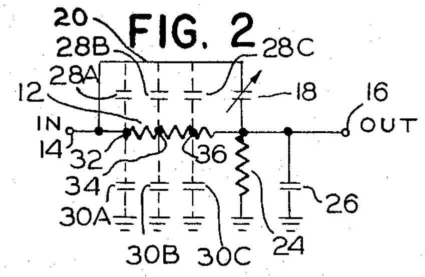
FIG. 2 is a schematic diagram of the electrical circuit of the attenuator of FIG. 1.

As shown in FIG. 2, the first distributed capacitance is represented by three capacitances 28A, 28B and 28C of progressively smaller value, while the second distributive capacitance is represented by three capacitances 30A, 30B and 30C of progressively larger value. Thus, for each point 32, 34 and 36 along the series resistor 12 corresponding to the junction of one of the first distributed capacitances 28A, 28B and 28C, with one of the second distributed capacitances 30A, 30B, and 30C, the capacitive voltage divider $C_u$ and $C_L$ has the same attenuation ratio as the resistance voltage divider $R^1$ and $R_2$. In other words, $C_u(C_u+C^L) = (R_t-R_x/R_t$, where $R_t = R_1 + R_2$, and $R_x$ is that portion of the series resistance 12 between one of the points 32, 34 or 36 and the input terminal 14.

Figure 3:
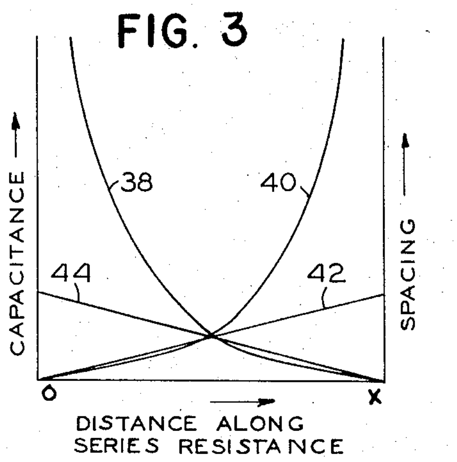
FIG. 3 is a graph showing the variation of spacing of the lead conductor and the ground conductor with respect to the input series resistance and the corresponding change in distributed capacitance, with distance along such resistor.

As shown in FIG. 3, the curve 38 of the first distributed capacitance $C^u$ decreases hyperbolically while the curve 40 of the second distributed capacitance $C_L$ increases hyperbolically with distance X along the input series resistance 12. Also, the curve 42 of the spacing between the lead conductor 20 and the series resistance 12 linearly increases while the curve 44 of the spacing between the ground conductor and such resistance linearly decreases with such distance.

Figure 4:
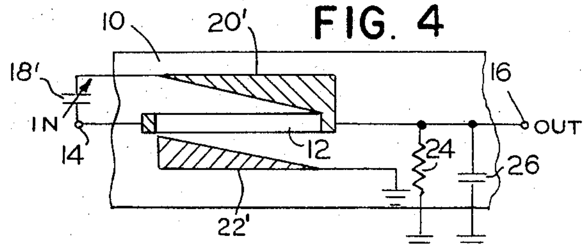
FIG. 4 is an elevation view of another embodiment of the attenuator apparatus of the present invention with a portion shown schematically.
Figure 5:
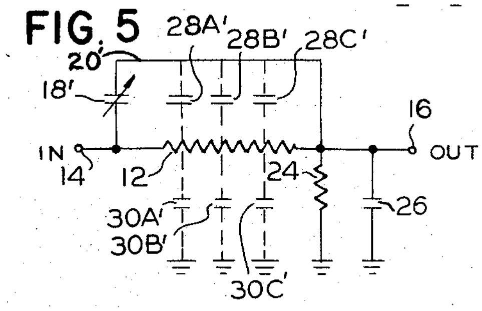
FIG. 5 is a schematic diagram of the electrical circuit of the attenuator of FIG. 4.

Another embodiment of the invention is shown in FIGS. 4 and 5 which is similar to the embodiment of FIGS. 1 and 2, so that the same reference numerals have been used to designate similar parts and only the differences will be described. The embodiment of FIGS. 4 and 5 differs primarily in that the variable capacitor 18' is connected between the input terminal 14 of the series resistor 12 and the input end of the lead conductor 20', while the output end of such lead conductor is directly connected to the output terminal of such series resistance. In addition, the spacing between the lead conductor 20' decreases while the spacing between the ground conductor 22' increases with distance along the series resistor 12 from its input terminal to its output terminal. As a result of this spacing difference, the first distributed capacitances 28A', 28B' and 28C' progressively increase in value while the second distributed capacitances 30A', 30B' and 30C' progressively decrease in value with such distance. It should be noted that the lead conductor 20' and the ground conductor 22' are of a triangular shape but this is merely for manufacturing convenience and they may be of the rectangular strip shape shown in FIG. 1. The advantage of the embodiment of FIGS. 4 and 5 over that of FIGS. 1 and 2 is that it has a lower input capacitance.

Figure 6A:
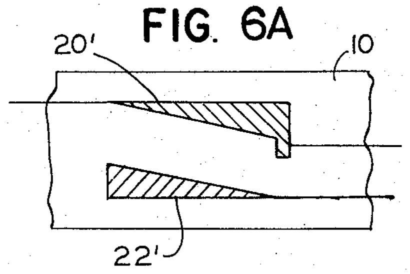
FIGS. 6A, 6B, 6C, and 6D show different steps in a method of manufacture of the attenuator apparatus of FIG. 4.
Figure 6B:
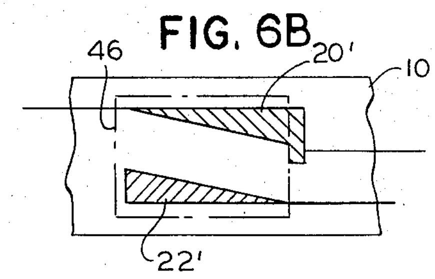
Figure 6C:
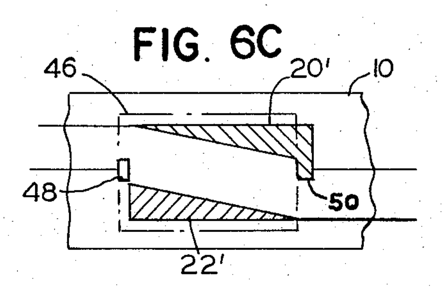
Figure 6D:
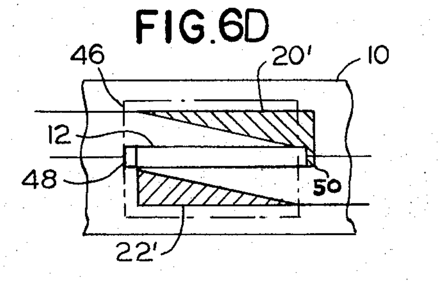

FIGS. 6A, 6B, 6C and 6D illustrate different steps used in one method of manufacture of the attenuator apparatus of FIG. 4. As shown in FIG. 6A, the lead conductor 20' and the ground conductor 22' are first coated on the ceramic substrate 10, such as by deposition through a mask. Next as shown in FIG. 6B, a layer 46 of glass insulator material is provided over the conductive regions 20' and 22' and for purposes of clarity such insulator layer is shown only in phantom lines. As shown in FIG. 6C, a metal contact area 48 is coated on the substrate 10 so that it overlaps the left end of the insulator layer 42 and extends along the surface of the ceramic substrate 10 to provide the input terminal 14. Finally, the series resistor 12 is provided as a layer of resistance material coated over the insulating layer 42 between the conductive contact region 48 and a tab portion 50 at the output end of the lead conductor. It should be noted that the insulating layer 42 completely insulates the ground conductor 22' from the series resistance 12, but the tab portion 50 of the lead conductor 20' extends beyond the right end of such insulating layer for connection to the output terminal of the series resistor 12.

It will be obvious to those having ordinary skill in the art that many changes may be made in the details of the above described preferred embodiments of the present invention without departing from the spirit of the invention. For example, the attenuator apparatus of the present invention can be employed on a substrate member of semiconductor material as part of an integrated circuit. Therefore, the scope of the present invention should only be determined by the following claims.

I claim:

1. Attenuator apparatus having distributed capacitance in which the improvement comprises:

a substrate member of insulating material;

a series resistance region provided as a layer of resistance material on said substrate member and connected between the input and output terminals of said attenuator;

a shunt resistance connected between said output terminal and a ground terminal;

a pair of conductor regions provided as layers of conductor material on said substrate member along opposite sides of said series resistance region, one of said conductor regions being a lead conductor connected at one end to one of the input and output terminals of the series resistance region, and the other conductor region being a ground conductor insulated from said resistance region and connected to a ground terminal;

a first capacitor connected in parallel with said series resistance between the other end of said lead conductor and the other of said input and output terminals;

a second capacitor connected in parallel with said shunt resistance;

said lead conductor region being spaced from said series resistance region by an amount which decreases with distance along said series resistance from said other terminal to said one terminal to provide a first distributed capacitance therebetween which increases with said distance; and said ground conductor region being spaced from said resistance region by an amount which increases with said distance to provide a second distributed capacitance therebetween which decreases with said distance.

2. An attenuator in accordance with claim 1 in which the first distributed capacitance increases hyperbolically and the second distributed capacitance decreases hyperbolically while the resistance of said series resistor changes linearly with said distance.

3. An attenuator in accordance with claim 1 in which the shunt resistance is on said substrate member.

4. An attenuator in accordance with claim 1 in which the product of said series resistance multiplied by said first capacitor is approximately equal to the product of said shunt resistance multiplied by said second capacitor.

5. An attenuator in accordance with claim 1 in which the second capacitor is coated on said substrate member.

6. An attenuator in accordance with claim 1 in which said one end of said lead conductor region is connected to the output terminal and the first capacitor is connected between said other end and said input terminal.

7. An attenuator in accordance with claim 1 in which said one end of said lead conductor region is connected to the input terminal, and the first capacitor is connected between said other end and said output terminal.

8. An attenuator in accordance with claim 1 in which an intermediate layer of insulating material is provided on said substrate member between said series resistor region and said pair of conductor regions.

9. An attenuator in accordance with claim 1 in which the first capacitor is variable.

10. An attenuator apparatus in accordance with claim 1 in which the first and second distributed capacitances have values so that at any point on the series resistance the capacitive divider formed by the first and second distributed capacitances has the same attenuation ratio as the resistance divider formed by the series and shunt resistances.

* * * * *

PO-1050
(5/69)

UNITED STATES PATENT OFFICE
CERTIFICATE OF CORRECTION

Patent No. 3,676,807 Dated July 11, 1972

Inventor(s) Machiel (n.m.i) Boer

It is certified that error appears in the above-identified patent and that said Letters Patent are hereby corrected as shown below:

Column 1, line 4, "in which in which" should be --in which--;

Column 3, line 42, "R1" should be --$R_1$--;

Column 3, line 43, "$C_u(C_u+C^L) = (R_t-R_x/R_t$" should be --$\frac{C_u}{C_u + C_L} = \frac{R_t - R_x}{R_t}$--;

Column 3, line 47, "$C^u$" should be --$C_u$--.

Signed and sealed this 19th day of December 1972.

(SEAL)
Attest:

EDWARD M.FLETCHER,JR.
Attesting Officer

ROBERT GOTTSCHALK
Commissioner of Patents